(12) United States Patent
DeSpain

(10) Patent No.: US 9,412,035 B2
(45) Date of Patent: *Aug. 9, 2016

(54) PLACE-BASED IMAGE ORGANIZATION

(71) Applicant: Microsoft Technology Licensing, LLC, Redmond, WA (US)

(72) Inventor: Stuart DeSpain, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,611

(22) Filed: Nov. 25, 2015

(65) Prior Publication Data

US 2016/0078308 A1    Mar. 17, 2016

Related U.S. Application Data

(63) Continuation of application No. 12/963,527, filed on Dec. 8, 2010.

(51) Int. Cl.
| | | |
|---|---|---|
| *G06K 9/46* | (2006.01) | |
| *G06K 9/66* | (2006.01) | |
| *G06F 17/30* | (2006.01) | |
| *G06T 7/00* | (2006.01) | |

(52) U.S. Cl.
CPC ............ *G06K 9/46* (2013.01); *G06F 17/30247* (2013.01); *G06F 17/30265* (2013.01); *G06F 17/30595* (2013.01); *G06T 7/0002* (2013.01); *G06T 2207/10016* (2013.01)

(58) Field of Classification Search
CPC ...................... G06F 17/30265; G06F 17/30268
See application file for complete search history.

(56) References Cited

U.S. PATENT DOCUMENTS

| | | | |
|---|---|---|---|
| 7,689,001 B2 | 3/2010 | Kim et al. | |
| 2002/0075329 A1 | 6/2002 | Prabhu et al. | |
| 2007/0073937 A1 | 3/2007 | Feinberg et al. | |
| 2007/0118508 A1 | 5/2007 | Svendsen | |
| 2007/0258642 A1* | 11/2007 | Thota | G06F 17/30241 382/173 |
| 2008/0064438 A1* | 3/2008 | Calvet | H04N 1/00244 455/556.1 |

(Continued)

FOREIGN PATENT DOCUMENTS

| | | |
|---|---|---|
| CN | 1967537 A | 5/2007 |
| CN | 101658012 A | 2/2010 |

(Continued)

OTHER PUBLICATIONS

Moxley et al., "Spirittagger: a geo-aaware tag suggestion tool mined from flickr", Oct. 31, 2008, ACM, Int. Conf. on Multimedia Information Retrieval 2008, p. 24-30.*

(Continued)

*Primary Examiner* — Stephen R Koziol
*Assistant Examiner* — Timothy Choi
(74) *Attorney, Agent, or Firm* — Damon Rieth; Tom Wong; Micky Minhas

(57) ABSTRACT

Systems and methods for image organization are provided. An computing device in accordance with embodiments of the present disclosure includes a processor configured to receive an image set comprising a plurality of images, compare a portion of each image in the image set with a verified cue library including a plurality of visual cues that correspond to different geographic place tags, and display a recommendation panel including a recommended place tag corresponding to a visual cue that matches the portion.

20 Claims, 6 Drawing Sheets

(56) References Cited

U.S. PATENT DOCUMENTS

| | | | |
|---|---|---|---|
| 2008/0204317 | A1 | 8/2008 | Schreve et al. |
| 2008/0226130 | A1* | 9/2008 | Kansal .................. G01C 21/20 382/106 |
| 2009/0202102 | A1* | 8/2009 | Miranda ............... G06T 1/0007 382/100 |
| 2009/0222432 | A1 | 9/2009 | Ratnakar |
| 2009/0257663 | A1 | 10/2009 | Luo et al. |
| 2009/0280824 | A1 | 11/2009 | Rautiainen |
| 2009/0324211 | A1 | 12/2009 | Strandell et al. |
| 2010/0076976 | A1 | 3/2010 | Sotirov et al. |
| 2010/0153386 | A1 | 6/2010 | Tysowski |
| 2011/0145239 | A1 | 6/2011 | Newman et al. |
| 2012/0148158 | A1* | 6/2012 | DeSpain ........... G06F 17/30265 382/190 |

FOREIGN PATENT DOCUMENTS

| | | |
|---|---|---|
| CN | 101902516 A | 12/2010 |
| JP | 2009176262 A | 8/2009 |
| JP | 2010218227 A | 9/2010 |
| JP | 2011065310 A | 3/2011 |
| JP | 2011215716 A | 10/2011 |
| KR | 1020080040064 A | 5/2008 |
| KR | 1020080053657 A | 6/2008 |
| TW | 200945068 A | 11/2009 |
| TW | 201020988 A | 6/2010 |
| WO | 2005024681 A1 | 3/2005 |

OTHER PUBLICATIONS

Schroff et al., "Harvesting Image Databases from the Web", Oct. 21, 2007, IEEE, Int. Conf. on Computer Vision 2007, p. 1-8.*

"Geotagging Flickr photos with Google Earth", Retrieved From <<http://www.trippermap.com/tutorials/google_earth.php>>, Oct. 11, 2010, 3 Pages.

"GMiF—Google Maps in Flickr", Retrieved From <<http://webdev.yuan.cc/gmif/>>, Oct. 11, 2010, 2 Pages.

"Image organizer", Retrieved From <<http://en.wikipedia.org/wiki/Image_organizer>>, Retrieved Date: Oct. 11, 2010, 6 Pages.

"Supplementary Search Report Issued in European Patent Application No. 11847421.2", Mailed Date: Mar. 27, 2015, 6 Pages.

"Final Office Action Issued in U.S. Appl. No. 12/963,527", Mailed Date: Sep. 5, 2014, 17 Pages.

"Non-Final Office Action Issued in U.S. Appl. No. 12/963,527", Mailed Date: Apr. 28, 2015, 19 Pages.

"Non-Final Office Action Issued in U.S. Appl. No. 12/963,527", Mailed Date: Dec. 6, 2013, 18 Pages.

"Notice of Allowance Issued in U.S. Appl. No. 12/963,527", Mailed Date: Aug. 25, 2015, 9 Pages.

"Notice of Allowance Issued in U.S. Appl. No. 12/963,527", Mailed Date: Nov. 20, 2015, 2 Pages.

"Notice of Allowance Issued in Chinese Patent Application No. 201110430592.7", Mailed Date: Mar. 23, 2015, 4 Pages.

"Office Action and Search Report Issued in Chinese Patent Application No. 201110430592.7", Mailed Date: Sep. 1, 2014, 12 Pages.

"Second Office Action and Search Report Issued in Chinese Patent Application No. 201110430592.7", Mailed Date: Dec. 25, 2013, 11 Pages.

"Office Action Issued in Japanese Patent Application No. 2013-543211", Mailed Date: Sep. 29, 2015, 3 Pages.

Epshtein, et al., "Hierarchical Photo Organization using Gee-Relevance", In Proceedings of the 15th Annual ACM International Symposium on Advances in Geographic Information Systems, Nov. 7, 2007, 7 Pages.

Hays, et al., "IM2GPS: Estimating Geographic Information from a Single Image", In Proceedings of the IEEE conference on Computer Vision and Pattern Recognition, Jun. 28, 2008, 10 Pages.

Kleban, et al., "Global Annotation on Georeferenced Photographs", In Proceedings of the ACM International conference on Image and Video Retrieval, Jul. 8, 2009, 8 Pages.

Li, et al., "Landmark Classification in Large-scale Image Collections", In Proceedings of the IEEE 12th International Conference on Computer Vision, Oct. 2, 2009, pp. 1957-1964.

"International Preliminary Report on Patentability Issued in PCT Application No. PCT/US11/62457", Mailed Date: Jun. 12, 2013, 5 Pages.

"International Search Report & Written Opinion Issued in PCT Application No. PCT/US11/62457", Mailed Date: Dec. 10, 2012, 9 Pages.

Rowse, Darren., "How to Geotag Images", Retrieved From <<http://www.digital-photography-school.com/how-to-geotag-image>>, Oct. 10, 2010, 9 Pages.

Moxley et al., "SpiritTagger: A Geo-Aware Tag Suggestion Tool Mined from Flickr", Oct. 31, 2008, Proceedings of the 1st ACM Int. Conf. on Multimedia information Retrieval, p. 24-30.

Schroff et al., "Harvesting Image Databases from the web", Oct. 21, 2007, IEEE 11th Int. Conf. on Computer Vision, p. 1-8.

Office Action Issued in Taiwan Patent Application No. 10-2010-7028097, Mailed Date: Apr. 22, 2016, 07 Pages.

\* cited by examiner

PLACE-BASED IMAGE ORGANIZATION

CROSS REFERENCE TO RELATED APPLICATIONS

This application is a continuation of U.S. patent application Ser. No. 12/963,527, filed on Dec. 8, 2010, and titled "PLACE-BASED IMAGE ORGANIZATION" the entire disclosure of which is hereby incorporated herein by reference for all purposes.

BACKGROUND

The modern consumer is able to capture images with an increasingly broad array of devices. As a result the consumer carries out a very time-consuming and labor-intensive process of organizing images captured by different devices into a digital image library. Geo-tagging facilitates image organization by matching an image to a geographic position at the time of image creation, but few devices offer this technology. Moreover, digital photography has been in use prior to the maturity geo-tagging technology, meaning a multitude of existing images cannot leverage geo-tagging or other location services.

SUMMARY

Systems and methods for image organization are provided. A computing device in accordance with embodiments of the present disclosure includes a processor configured to receive an image set comprising a plurality of images, compare a portion of each image in the image set with a verified cue library including a plurality of visual cues that correspond to different geographic place tags, and display a recommendation panel including a recommended place tag corresponding to a visual cue that matches the portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present description is directed to systems and methods for recommending and assigning place tags to images in order to facilitate organization of the images through indexing by place. More particularly, the present description is directed to recommending place tags for images based on a comparison of the images with different verified cues that correspond to the place tags. By recommending place tags for images based on matching different verified cues, images may be assigned place tags even after image creation. Accordingly, legacy images that were not assigned a place tag at creation may be assigned a place tag, so that the legacy images may be indexed by place. Moreover, images may be place-tagged without utilizing global position system (GPS) enabled cameras and the like.

Furthermore, the recommendation function may be applied to a single image or an image set including a plurality of images so that each image in the image set does not have to be individually place-tagged. By recommending place tags for an entire set of images, manual tagging of single images can be reduced or eliminated. Accordingly, image organization via place indexing may be performed quickly and easily in an automated or semi-automated manner, as desired.

Figure 1:
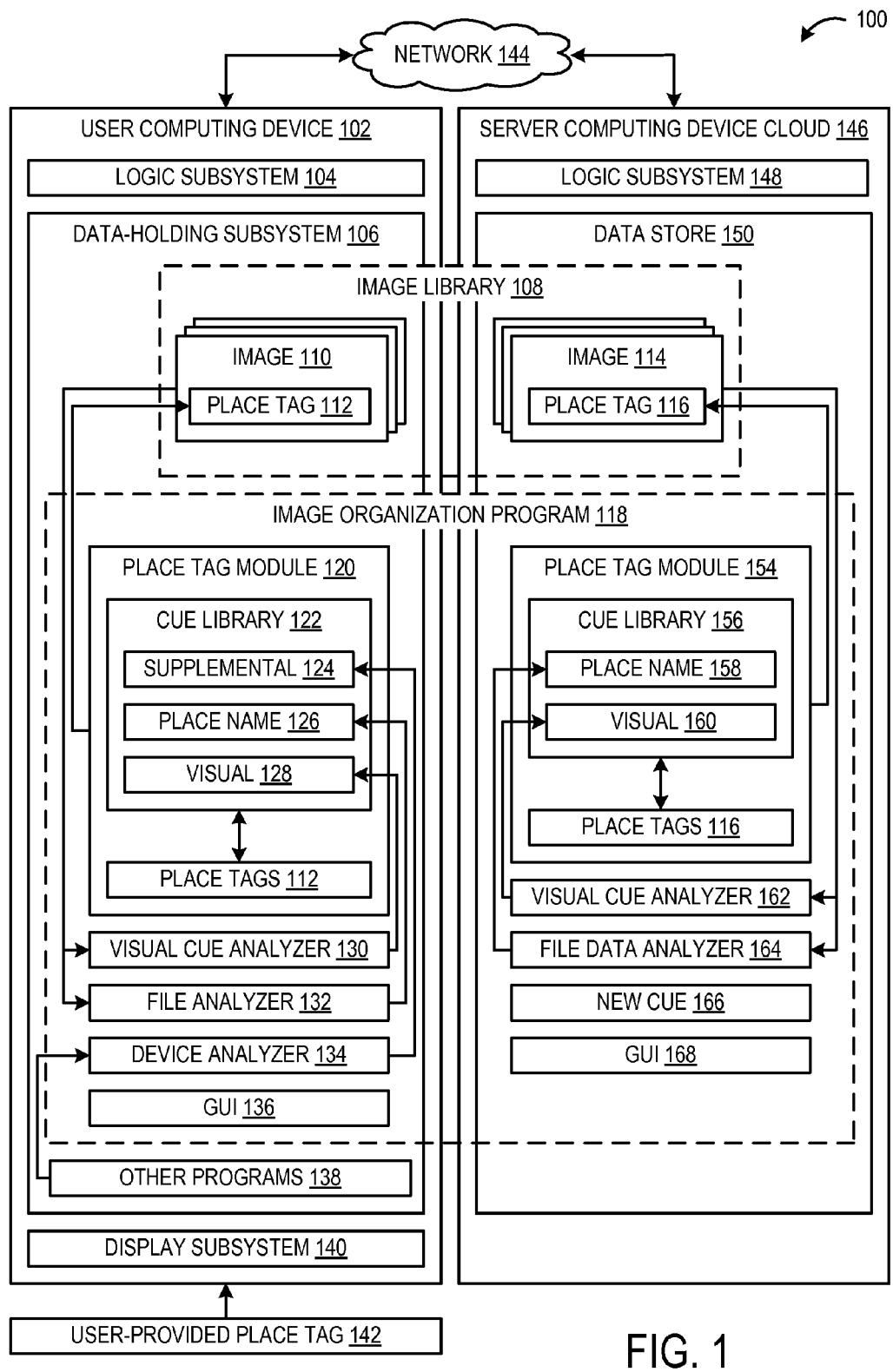
FIG. 1 is a schematic diagram of an embodiment of a computing system of the present disclosure.

FIG. 1 schematically shows a nonlimiting embodiment of a computing system 100 in which methods or processes for recommending and assigning place tags to images may be carried out. The computing system 100 is shown in simplified form. It is to be understood that virtually any computer architecture may be used without departing from the scope of this disclosure. The computing system 100 may include a user computing device 102 that communicates with a server computing device or computing device cloud 146 through a network 144.

In different embodiments, the user computing device 102 may take the form of a desktop computer, laptop computer, tablet computer, home entertainment computer, network computing device, mobile computing device, mobile communication device, gaming device, etc. Additionally, the computing device cloud 146 may include a plurality of different sources that communication with each other through network 144. The different sources of the computing device cloud 146 may take the form of a variety of different computing devices including a mainframe computer, server computer, desktop computer, laptop computer, tablet computer, home entertainment computer, network computing device, mobile computing device, mobile communication device, gaming device, etc.

In different embodiments, the network 144 may take the form of a local area network (LAN), wide area network (WAN), wired network, wireless network, personal area network, or a combination thereof including the Internet.

The user computing device 102 includes a logic subsystem 104 and a data-holding subsystem 106, and a display subsystem 140 and/or other components not shown in FIG. 1, such as user input devices including keyboards, mice, game controllers, cameras, microphones, and/or touch screens, for example.

The logic subsystem 104 may include one or more physical devices configured to execute one or more instructions. For example, the logic subsystem 104 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 104 may include one or more processors that are configured to execute software instructions. Additionally or alternatively, the logic subsystem 104 may include one or more hardware or firmware logic machines configured to execute hardware or firmware instructions. Processors of the logic subsystem 104 may be single core or multicore, and the programs executed thereon may be configured for parallel or distributed processing. The logic subsystem 104 may optionally include individual components that are distributed throughout two or more devices, which may be remotely located and/or configured for coordinated processing. One or more aspects of the logic subsystem 104 may be virtualized and executed by remotely accessible networked computing devices such as a logic subsystem 148 included in computing device cloud 146.

The data-holding subsystem 106 may include one or more physical, non-transitory, devices configured to hold data and/or instructions executable by the logic subsystem to implement the herein described methods and processes. When such methods and processes are implemented, the state of data-holding subsystem 106 may be transformed (e.g., to hold different data).

The data-holding subsystem 106 may include removable media and/or built-in devices. The data-holding subsystem 106 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 106 may include removable computer-readable storage media, which may be used to store and/or transfer data and/or instructions executable to implement the herein described methods and processes. The removable computer-readable storage media may take the form of CDs, DVDs, HD-DVDs, Blu-Ray Discs, EEPROMs, and/or floppy disks, among others. The data-holding subsystem 106 may include devices with one or more of the following characteristics: volatile, nonvolatile, dynamic, static, read/write, read-only, random access, sequential access, location addressable, file addressable, and content addressable. In some embodiments, the logic subsystem 104 and data-holding subsystem 106 may be integrated into one or more common devices, such as an application specific integrated circuit or a system on a chip.

It is to be appreciated that data-holding subsystem 106 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of the computing system 100 that is implemented to perform one or more particular functions. In some cases, such a module, program, or engine may be instantiated by the user computing device 102 via logic subsystem 104 executing instructions held by data-holding subsystem 106. In some cases, such a module, program, or engine may be instantiated by the server computing device/cloud 146 via logic subsystem 148 executing instructions held by datastore 150. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

Note components of the user computing device 102 that may be substantially the same as those of the server computing device/cloud 146 are described no further.

A plurality of images may be collected to form an image library 108. In some embodiments, the image library 108 may be stored in the data-holding subsystem 106 of the user computing device 102. In some embodiments, the image library 108 may be stored in a data store 150 of the server computing device/cloud 146. In some embodiments, the image library 108 may include a local component that includes images 110 stored in the data-holding subsystem 106 of the user computing device 102 and a remote component that includes images 114 stored in the data store 150 or other data-holding devices dispersed throughout the computing device cloud 146.

An image organization program 118 may be configured to organize the image library 108 according to different indices. More particularly, the image organization program 118 may be configured to recommend place tags to be assigned to images in the image library 108 so that the image library 108 may be indexed by place. A place tag may include metadata that identifies a geographic location, such as a place name and/or latitude and longitude coordinates. In some cases, an image in the image library may be assigned more than one place tag. For example, an image of the Eiffel Tower may be assigned an "Eiffel Tower" place tag, a "Paris" place tag and a "France" place tag.

In some embodiments, the data-holding subsystem 106 may hold instructions constituting the image organization program 118 that are executed locally on the user computing device 102 by logic subsystem 104. Correspondingly, in some cases, place tags 112 existing locally on the user computing device may be tagged to the local images 110 by the image organization program 118. In some embodiments, the datastore 152 may hold instructions constituting the image organization program 118 that are executed remotely in the computing device cloud 146 by the logic subsystem 148. Correspondingly, in some cases, place tags 116 aggregated from different sources in the computing device cloud 146 may be tagged to remote images 114 by the image organization program 118. In different embodiments, the image organization program 118 may take the form of, or be incorporated into, an executable application, browser plug-in, HTML5 file, mobile application, desktop application, etc.

In a local implementation of the image organization program 118 that is executed on the user computing device 102, the image organization program 118 may include a place tag module 120 that may be configured to recommend place tags to be assigned to a selected set of local images 110 in the image library 108. The place tag module 120 may include a verified cue library 122 of cues that correspond to different place tags 112. The verified cue library 122 may be populated with local existing cues identified from local images 110 stored in data-holding subsystem 106. In one example, the verified cue library 122 takes the form of a relational database in which different cues are linked to different place tags through different relationships.

The verified cue library 122 may include visual cues 128, place name cues 126, and supplemental cues 124. The visual cues 128 may include visual patterns or signatures that define a geographic place that corresponds to a place tag. Nonlimiting examples of visual cues 128 may include light temperature, shadows, object shape, language, etc.

The place name cues 126 may include various geographic locations that may be compared to a file name of the image 110 in order to recommend a corresponding place tag. Nonlimiting examples of place name cues 126 may include landmarks, neighborhoods, cities, states countries, etc.

The supplemental cues 124 may include information extracted from other programs 138 executed on the user computing device 102 that may link metadata of an image to a geographic place tag. As one example, a supplemental cue may include information extracted from an entry into a schedule or calendar program that provides a location of the user computing device 102 at a particular time that corresponds to a geographic place tag. As another example, a supplemental cue may include information extracted from a network connection program. In particular, an internet protocol (IP) address may be used to identify a location of the user computing device 102 at a particular time that corresponds to a geographic place tag.

As yet another example, in an embodiment where the user computing device 102 is a phone, a supplemental cue may include information extracted from placing a phone call. In particular, the position of the phone may be provided by the location of a cellular tower that relays the call. In the above examples, the place tag module 120 may compare a time stamp of an image with a time provided by the supplemental cue and may recommend a geographic place tag that corresponds to the supplemental cue. It will be appreciated that supplemental cues linked to image metadata other than time stamps may be extracted from the other programs 138 executed by the user computing device 102.

The image organization program 118 may include a visual cue analyzer 130 configured to analyze images 110 to extract portions of each image to compare to the visual cues 128 in the verified cue library 122. The place tag module 120 may recommend place tags 112 that correspond to visual cues 128 in the verified cue library 122 that match portions of the images 110 provided by the visual cue analyzer 130.

The image organization program 118 may include a file analyzer 132 configured to extract metadata including file names from images 110 to compare to the place name cues 126 in the verified cue library 122. The place tag module 120 may recommend place tags 112 that correspond to place name cues 126 in the verified cue library 122 that match the metadata including the file name provided by the file analyzer 132.

The image organization program 118 may include a device analyzer 134 configured to extract information from other programs 138 executed by the user computing device 102 that may be used to match image metadata with geographic place tags. The place tag module 120 may recommend place tags 112 that correspond to supplemental cues 124 in the verified cue library 122 that match the information provided by the device analyzer 134.

In some cases, a user may assign a user-provided place tag 142 to a selected image in the image library 108. The place tag module 120 may be configured to compare cues in the verified cue library 122 that correspond to the user-provided place tag 142 with images in the image library 108. The place tag module 120 may provide a recommendation that the user-provided place tag 142 be assigned to one or more matching images in the image library 108.

The image organization program 118 may be configured to display an image organization graphical user interface (GUI) 136 on display subsystem 140. The image organization GUI 136 may be configured to display recommended place tags to a user. Further, the image organization GUI 136 may be configured to display images organized by different indices to a user. The image organization GUI 136 will be discussed in further detail below with reference to FIGS. 2-4. As the herein described methods and processes change the data held by the data-holding subsystem 106, and thus transform the state of the data-holding subsystem, the state of display subsystem 140 may likewise be transformed to visually represent changes in the underlying data. Display subsystem 140 may include one or more display devices utilizing virtually any type of technology. Such display devices may be combined with logic subsystem 104 and/or data-holding subsystem 106 in a shared enclosure, or such display devices may be peripheral display devices.

Continuing with FIG. 1, in a global implementation of the image organization program 118 that is executed by the computing device cloud 146, the image organization program 118 may include a place tag module 154 that may include a verified cue library 156 of cues that correspond to different place tags 116. The verified cue library 156 may be populated with verified cues identified from images 114 aggregated from different sources (e.g., computing devices) of the computing device cloud and stored in data-store 150. In one example, the verified cue library 156 takes the form of a relational database in which different cues are linked to different place tags through different relationships. The verified cue library 156 may include visual cues 160 and place name cues 158.

The verified cue library 156 may be repeatedly updated with different verified cues that correspond to place tags that are aggregated from different sources of the computing device cloud 146. For example, the image organization program 118 may receive a new cue 166 from a source of the computing device cloud 146 that is added to the verified cue library 156. When the new cue 166 is added the verified cue library aggregated information may be increased to make the verified cue library 156 more comprehensive. In particular, since there are more cues, place tags, and linking relationships in the global implementation of the verified cue library 156, recommendations may be more accurate and the likelihood of matching a place tag to an image may be increased.

The image organization program 118 may include a visual cue analyzer 162, a file analyzer 164, and an image organization GUI 168. These components may be substantially the same as those of the local implementation and are described no further.

In some embodiments, the global image organization program 118 may recommend place tags for images that are stored globally in the data store 150. In some embodiments, the global image organization program 118 may recommend place tags for images that are stored locally in the data-holding subsystem 106 of the user computing device 102. In other words, a selected set of images may be received by the global implementation of the image organization program from a user computing device. The global implementation of the image organization program may analyze the images in the image set, and may send recommended place tags corresponding to cues that match images in the selected image set to the user computing device.

Figure 2:
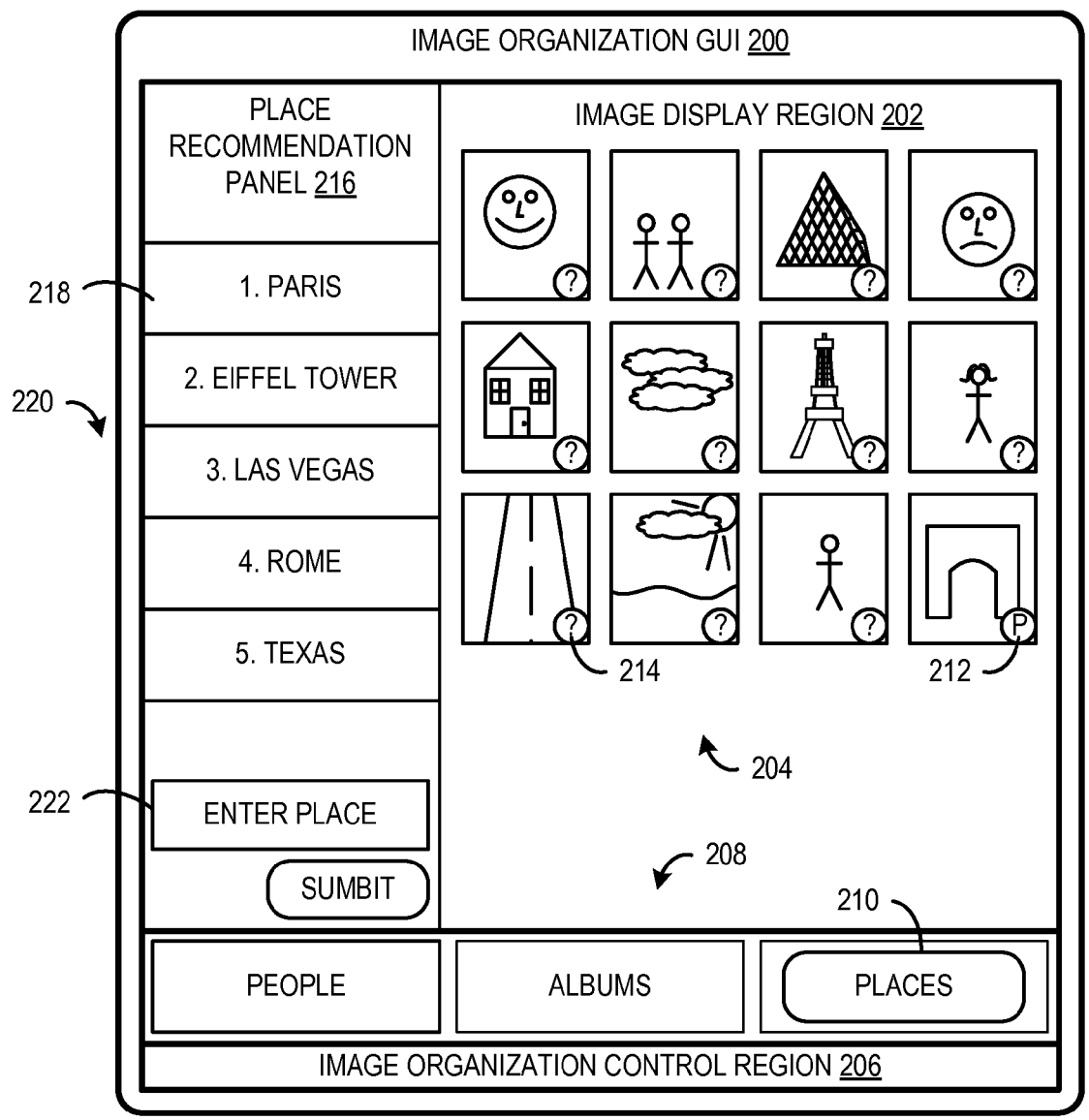
FIG. 2 is view of an embodiment of an image organization graphical user interface of the present disclosure.
Figure 3:
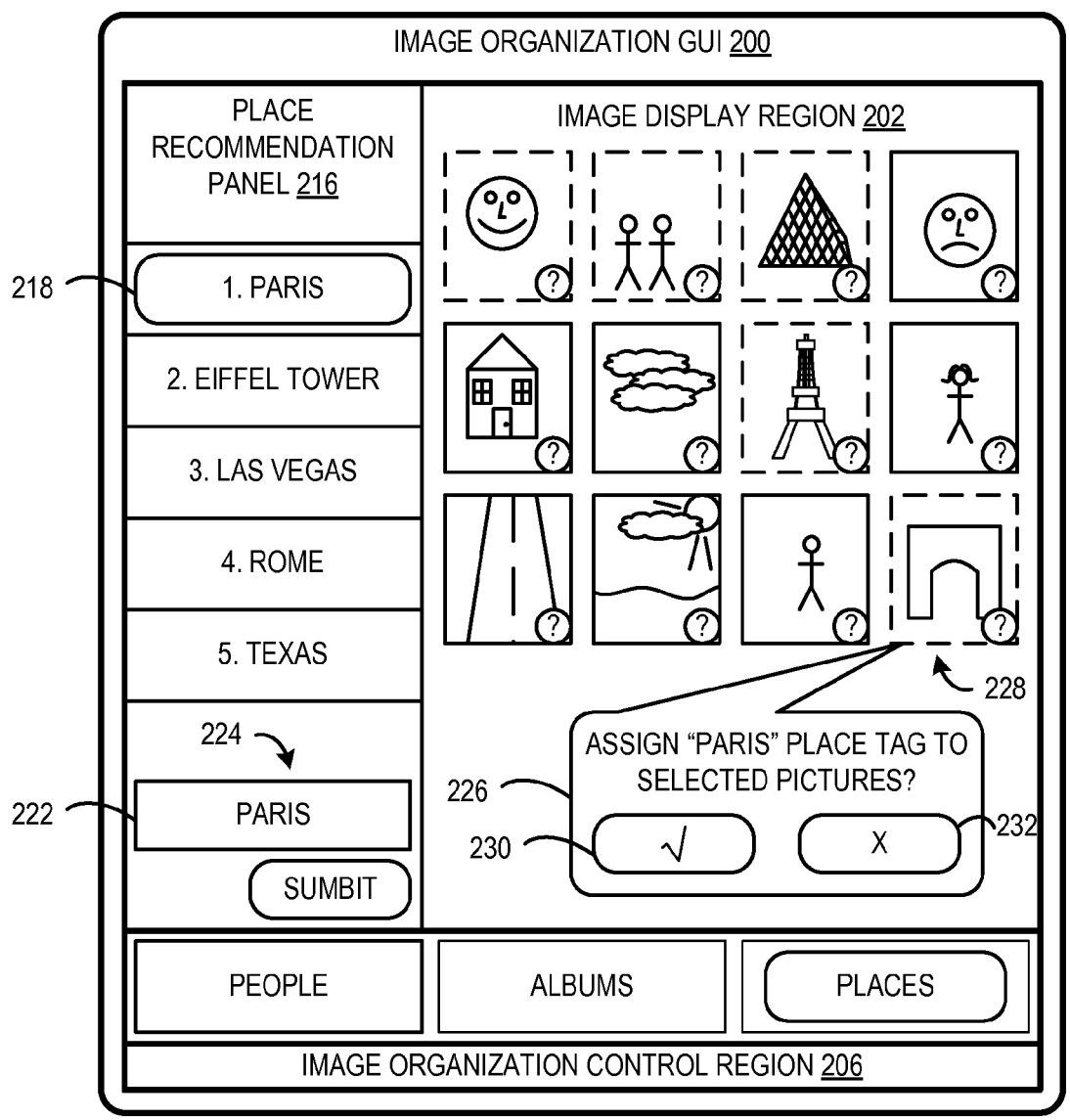
FIG. 3 is another view of the image organization graphical user interface of FIG. 2.
Figure 4:
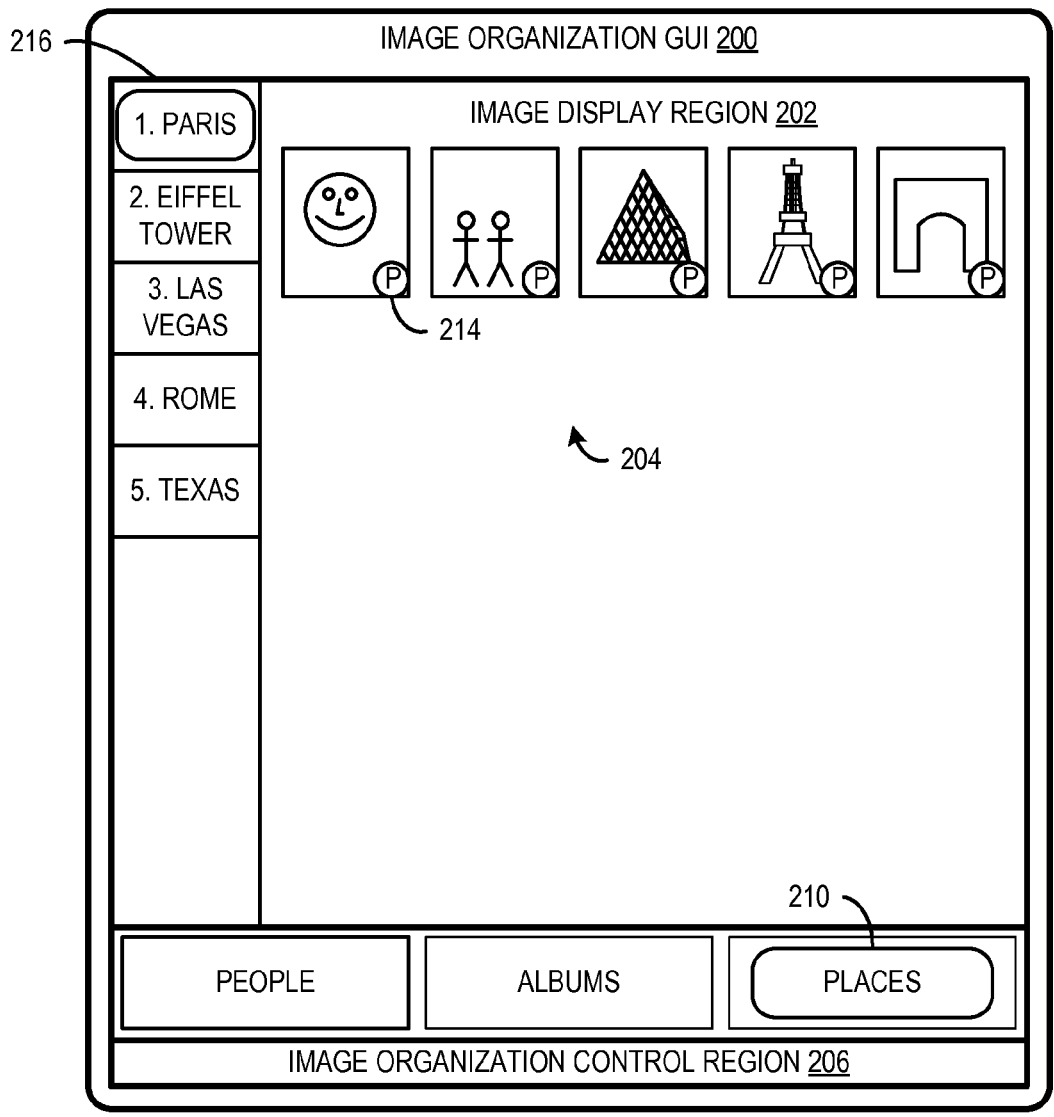
FIG. 4 is another view of the image organization graphical user interface of FIG. 2.

FIGS. 2-4 are different views of an embodiment of an image organization GUI 200 of the present disclosure. In one example, the image organization GUI may be displayed on display subsystem 140 by the image organization program 118 as shown in FIG. 1.

The image organization GUI 200 may include an image display region 202 including a plurality of images 204. The plurality of images 204 may form part or all of an image library. Each of the plurality of images 204 in the image display region 202 may include metadata that may be used to organize or filter images by different indices.

The image organization GUI 200 may include an image organization control region 206 including a plurality of category selectors 208 that may be selectable to organize the plurality of images 204 by different indices. In the illustrated embodiment, the plurality of category selectors 208 includes a people category selector, an albums category selector, and a places category selector as examples; however, it will be appreciated that any suitable category selector may be included in the image organization control region 206.

Each image that includes metadata including an assigned organizational tag, such as a place tag, displayed in the image display region 202 may include a tag icon 212. The tag icon 212 may indicate to a user that the image is tagged and can be indexed by a selected one of the plurality of category selectors 210. Each image without an assigned organizational tag, such as a place tag, displayed in the image display region may include a recommendation icon 214 indicating that no place tag is assigned to that image. The recommendation icon 214 may aid a user in identifying and selecting sets of images without place tags, so that place tags can be recommended for and assigned to the entire selected image set.

The image organization GUI 200 may include a recommendation panel 216 including one or more place tag selectors 218. The place tag selectors 218 may be selectable to assign a recommended place tag to selected images in the image display region 202 that match a verified cue that corresponds to the recommended place tag. In the case of visual cues, one or more place tag selectors may be selectable to assign a recommended place tag to selected images that include a portion that matches a visual cue that corresponds to the recommended place tag. In the case of place name cues, one or more place tag selectors may be selectable to assign a recommended place tag to selected images that include a file name that matches a place name cue that corresponds to the recommended place tag.

In some embodiments, the recommendation panel 216 may include a ranked list 220 of recommended place tags that correspond to the place tag selectors 218. The ranked list 220 may be organized by the image organization program 118 based a relationship or correspondence strength between the image and a matching verified cue.

The image organization GUI 200 may include a user-provided place tag region 222 configured to receive a user-provided place tag to be assigned to one or more selected images in the image display region 202. As shown in FIG. 3, the image organization program 118 may be configured to, in response to receiving a user-provided place tag 224 entered in the user-provided place tag region 222, indicate one or more images in the display region 202 that matches a verified cue that corresponds to the user-provided place tag 224. The images matching cues corresponding to the user-provided place tag 224 are indicated by an indicator 228 (e.g., dashed lines). The indicator 228 may also indicate images in an image set that are selected for place tag recommendations. The indicator 228 may aid a user in verifying which images match a recommended place tag.

The image organization program 118 may be configured to, in response to receiving a selection of a recommended place tag selector 218, display a verification window 226 in the image organization graphical user interface 200. The verification window 226 may include a verification selector 230 configured to accept a user verification and assign the recommended place tag of selector 218 to the selected images as indentified by indicator 228. The verification window 226 may include a rejection selector 232 configured to accept a user rejection and deselect the selected images as identified by indicator 228.

FIG. 4 shows another view of the image organization graphical user interface 200. In this view, the plurality of images 204 in the image display region 202 has been assigned the same place tag as indicated by tag icons 212. The place category selector 210 in the image organization control region 206 has been selected to organize the plurality of images 204 displayed in the image display region 202 by assigned place tags, and the place tag selector 218 in the recommendation panel 216 has been selected. In this example, by selecting the place tag selector 218 only images that have been assigned the corresponding place tag are displayed in the image display region as indicated by the tag icon 212 shared by each image, and other images are filtered out of the image display region 202.

Figure 5:
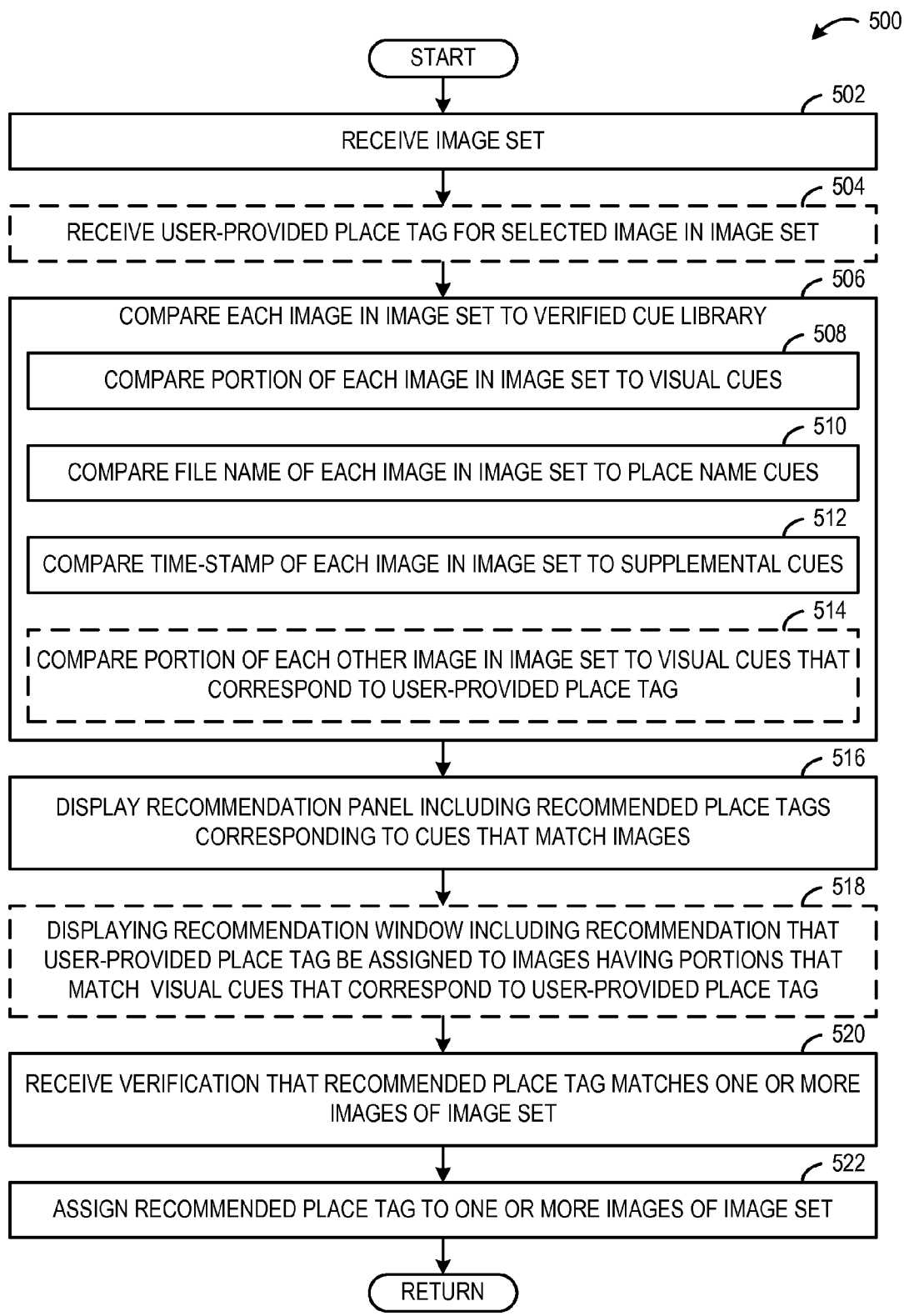
FIG. 5 is a flowchart of an embodiment of an image organization method performed at user computing device.

FIG. 5 is a flowchart of an embodiment of an image organization method 500. The method 500 may be performed at a user computing device, such as the user computing device 102 shown in FIG. 1. At 502, the method may include receiving an image set comprising a plurality of images. In some cases, one or more of the plurality of images in the image set may not have an assigned place tag. In some cases, one or more of the plurality of images in the image set may have one or more assigned place tags.

In some cases, at 504, the method may include receiving a user-provided place tag for a selected image of the image set. The user-provided place tag may act as a guide to facilitate place-tagging of other matching images in the image set. If a user-provided place tag is not provided 504 may be omitted from the method 500.

At 506, the method may include comparing each image in the image set with a verified cue library. The verified cue library may include a plurality of visual cues that correspond to different geographic place tags. At 508, the method may include comparing a portion of each image in the image set with the plurality of visual cues.

The verified cue library may include a plurality of place name cues that correspond to different geographic place tags. At 510, the method may include comparing a file name of each image in the image set with the place name cues. The verified cue library may include a plurality of supplemental cues provided from other application executable by the user computing device that correspond to different geographic place tags. At 512, the method may include comparing a time stamp of each image in the image set with the supplemental cues. If a user-provided place tag for a selected image set is received, at 514, the method may include comparing a portion of each other image in the image set with visual cues that correspond to the user-provided place tag. If a user-provided place tag is not provided 514 may be omitted from the method 500.

At 516, the method may include displaying a recommendation panel including a recommended place tag corresponding to a cue that matches an image. For visual cues, a recommended place tag that corresponds to a visual cue that matches a portion of an image may be displayed in the recommendation panel. For place name cues, a recommended place tag that corresponds to a place name cue that matches a file name of an image may be displayed in the recommendation panel. For supplemental cues, a recommended place tag that corresponds to a supplemental cue that matches a time stamp of an image may be displayed in the recommendation panel.

At 518, the method may include displaying a recommendation window including a recommendation that the user-provided place tag be assigned to images having portions that match the visual cues that correspond to the user-provided place tag. If a user-provided place tag is not provided 518 may be omitted from the method 500.

At 520, the method may include receiving a verification that the recommended place tag matches one or more images. The verification may be provided by a user through selection of a verification selector.

At 522, the method may include assigning the recommended place tag to one or more images of the image set in response to receiving the verification that the recommended place tag matches the one or more images. Assigning the recommended place tag may include writing the place tag to metadata of an image file of one or more images of the image set.

By recommending place tags that correspond to cues that match images, images may be assigned place tags without leveraging global position system (GPS) or other device location tracking technology. Accordingly, a user's image collection can be organized by place, even if the images were not geo-tagged at image creation.

Figure 6:
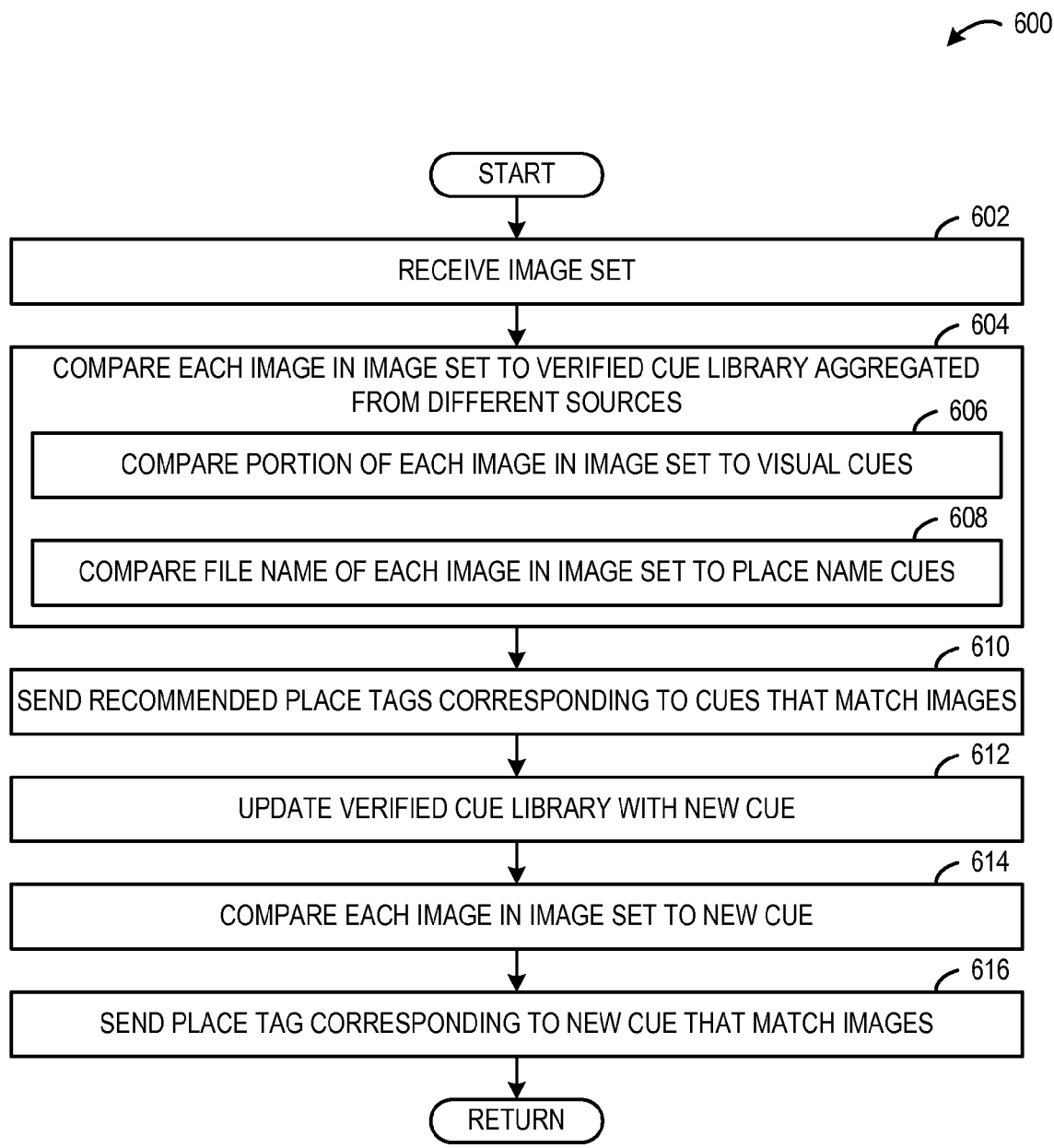
FIG. 6 is a flowchart of an embodiment of an image organization method performed at server computing device.

FIG. 6 is a flowchart of an embodiment of an image organization method 600. The method 600 performed at a server computing device, such as the server computing device or cloud 146 shown in FIG. 1. At 602, the method may include receiving, from a user computing device, an image set comprising a plurality of images. In some cases, one or more of the plurality of images in the image set may not have an assigned place tag. In some cases, one or more of the plurality of images in the image set may have one or more assigned place tags.

At 604, the method may include comparing each image in the image set with a verified cue library including a plurality of cues that correspond to different geographic place tags. The plurality of cues may be aggregated from a plurality of different sources in a computing device cloud. The verified cue library may include a plurality of visual cues that correspond to different geographic place tags. At 606, the method may include comparing a portion of each image in the image set with the plurality of visual cues. The verified cue library may include a plurality of place name cues that correspond to different geographic place tags. At 608, the method may include comparing a file name of each image in the image set with the place name cues.

At 610, the method may include sending, to the user computing device, a recommended place tag corresponding to a cue that matches an image. For visual cues, a recommended place tag that corresponds to a visual cue that matches a portion of an image may be sent to the user computing device. For place name cues, a recommended place tag that corresponds to a place name cue that matches a file name of an image may be sent to the user computing device.

At 612, the method may include updating the verified cue library with a new cue. The new cue may correspond to a geographic place tag. For example, the cue may include a relational pointer that points to the geographic place tag in the verified cue library. The new cue may take the form of a visual cue or a place name cue. In one example, the new cue may be received from one of the plurality of different sources in the computing device cloud. In another example, the new cue may be received from a user via the user computing device.

At 614, the method may include comparing each image in the image set to the new cue. At 616, the method may include sending, to the user computing device, the geographic place tag that corresponds to the new cue that matches the images. If the new cue is a visual cue, a geographic place tag that corresponds to the new visual cue that matches a portion of an image may be sent to the user computing device. If the new cue is a place name cue, a geographic place tag that corresponds to the new place name cue that matches a file name of an image may be sent to the user computing device.

By updating the verified cue library with cues aggregated from a plurality of different sources, the cue library may become more comprehensive and may provide more accurate place tag recommendations. Moreover, by sending additional place tag recommendations that are updated with the addition of new cues, the likelihood of images being assigned place tags may be increased.

In some embodiments, the above described methods and processes may be tied to a computing system including one or more computers. In particular, the methods and processes described herein may be implemented as a computer application, computer service, computer API, computer library, and/or other computer program product.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computer system, comprising:
   at least one processor;
   memory having instructions stored thereon that when executed by the at least one processor perform acts comprising:
      determining a geographic location of a mobile computing device from placement of a call;
      receiving an image set comprising a plurality of images, with the placement of the call being temporally proximate to a time stamp of one or more images in the image set;
      comparing a portion of each image in the image set with a verified cue library, the verified cue library including a plurality of visual cues that correspond to different geographic place tags and one or more supplemental cues including the geographic location from the placement of the call; and
      displaying a recommendation panel including a recommended place tag corresponding to a visual cue that matches the portion.

2. The computer system of claim 1, wherein the acts further comprise assigning the recommended place tag to one or more images of the image set in response to receiving a verification that the recommended place tag matches the one or more images.

3. The computer system of claim 1, wherein the acts further comprise:
   receiving a user-provided place tag for a selected image of the image set;
   comparing a portion of each other image in the image set with visual cues that correspond to the user-provided place tag; and
   displaying a recommendation window including a recommendation that the user-provided place tag be assigned to images having portions that match the visual cues that correspond to the user-provided place tag.

4. The computer system of claim 1, wherein the visual cues in the verified cue library are extracted from verified images stored in the computer system.

5. The computer system of claim 1, wherein the visual cues in the verified cue library are extracted from verified images aggregated from a plurality of computing devices and stored in a data store of a remote computing device cloud accessible by the computer system.

6. The computer system of claim 1, wherein the verified cue library includes a plurality of place name cues that correspond to different geographic place tags, and wherein the processor is further configured to:
   compare a file name of each image in the image set with the place name cues; and
   display, in the recommendation panel, a recommended place tag corresponding to a place name cue that matches the file name.

7. The computer system of claim 1, wherein the recommendation panel includes a ranked list of recommended place tags.

8. The computer system of claim 1, wherein one or more of the plurality of images in the image set does not have an assigned place tag.

9. The computer system of claim 1, wherein the verified cue library includes a plurality of supplemental cues, the supplemental cues provided from other applications executable by the computer system that correspond to different geographic place tags, and wherein the acts further comprise:
   comparing a time stamp of each image in the image set with the supplemental cues; and
   displaying, in the recommendation panel, a recommended place tag corresponding to a supplemental cue of the supplemental cues that matches the time stamp.

10. A computer system comprising:
    at least one processor;
    memory having instructions stored thereon that when executed by the at least one processor perform acts comprising:
       determining a geographic location of a mobile computing device from placement of a call;
       receiving an image set comprising a plurality of images, the placement of the call being temporally proximate to a time stamp of one or more images in the image set;
       comparing a portion of each image in the image set with a verified cue library, the verified cue library including a plurality of visual cues that correspond to different geographic place tags and one or more supplemental cues including the geographic location from the placement of the call; and
       assigning a recommended place tag to an image having a portion that matches a visual cue in the verified cue library, and that matches the geographic location from the placement of the call.

11. The computer system of claim 10, wherein the acts further comprise:
    displaying an image organization graphical user interface comprising:
       an image display region including a plurality of images from the image set;
       an image organization control region including a place category selector selectable to organize images displayed in the image display region by assigned place tags; and
       a recommendation panel including one or more place tag selectors selectable to assign a recommended place tag to selected images that include a portion that matches a visual cue that corresponds to the recommended place tag, the assigning of the recommendation place tag being performed in response to a selection of the assigned recommendation place tag from the recommendation panel.

12. The computer system of claim 11, wherein each image without an assigned place tag displayed in the image display region includes a recommendation icon indicating that no place tag is assigned to that image.

13. The computer system of claim 11, wherein the recommendation panel includes a ranked list of recommended place tags.

14. The computer system of claim 11, wherein the recommendation panel includes one or more place tag selectors selectable to assign a recommended place tag to selected images that include a file name that matches a place name cue that corresponds to the recommended place tag.

15. The computer system of claim 11, wherein the acts comprise, in response to receiving a selection of a place tag selector, displaying a verification window in the image organization graphical user interface, the verification window including a verification selector configured to accept a user verification and assign the recommended place tag to the selected images.

16. The computer system of claim 11, wherein the image organization graphical user interface further comprises: a user-provided place tag region configured to receive a user-provided place tag to be assigned to one or more selected images in the image display region, and wherein the acts further comprise, in response to receiving the user-provided place tag, indicating one or more images in the display region that includes a portion that matches a visual cue that corresponds to the user-provided place tag.

17. A computer-implemented image organization method, comprising:
    determining a geographic location of a mobile computing device from placement of a call;
    receiving an image set including a plurality of images, the placement of the call being temporally proximate to a time stamp of one or more images in the image set;
    comparing a portion of each image in the image set with a verified cue library, the verified cue library including a plurality of visual cues that correspond to different geographic place tags and one or more supplemental cues including the geographic location from the placement of the call; and
    displaying a recommendation panel including a recommended place tag corresponding to a visual cue that matches the portion.

18. The method of claim 17, wherein the verified cue library includes a plurality of place name cues that correspond to different geographic place tags, the method further comprising receiving a recommended place tag corresponding to a place name cue that matches a file name of an image in the image set.

19. The method of claim 17, wherein one or more of the plurality of images in the image set does not have an assigned place tag.

20. The method of claim 17, further comprising:
    receiving verification that the recommended place tag matches the image corresponding to the portion; and
    assigning the recommended place tag to the image corresponding to the portion.

* * * * *